April 14, 1959 W. F. LASER ET AL 2,882,076
ROTARY SEAL
Filed Aug. 23, 1956 2 Sheets-Sheet 1
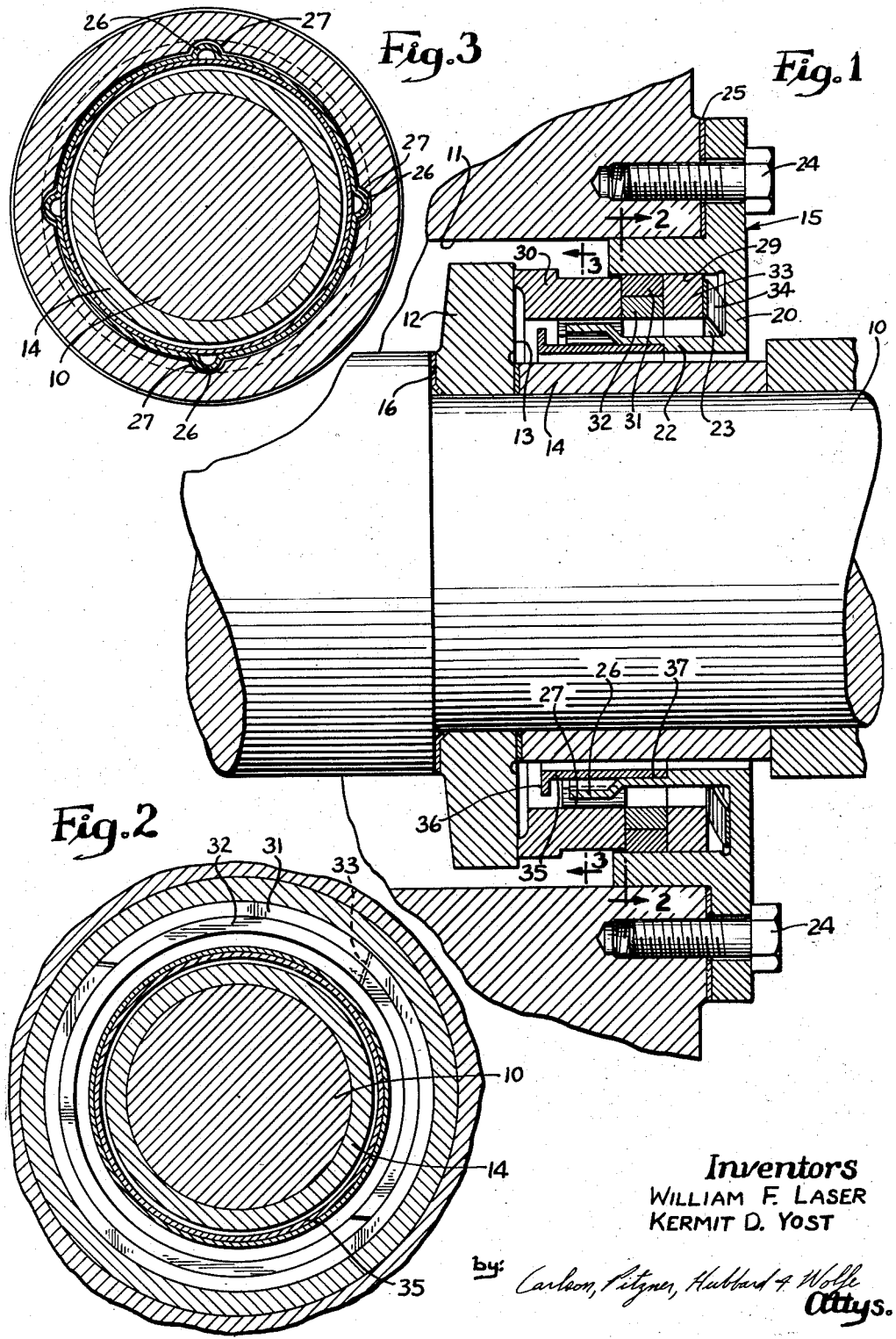
Inventors
WILLIAM F. LASER
KERMIT D. YOST
by: Carlson, Pitzner, Hubbard & Wolfe
Attys.

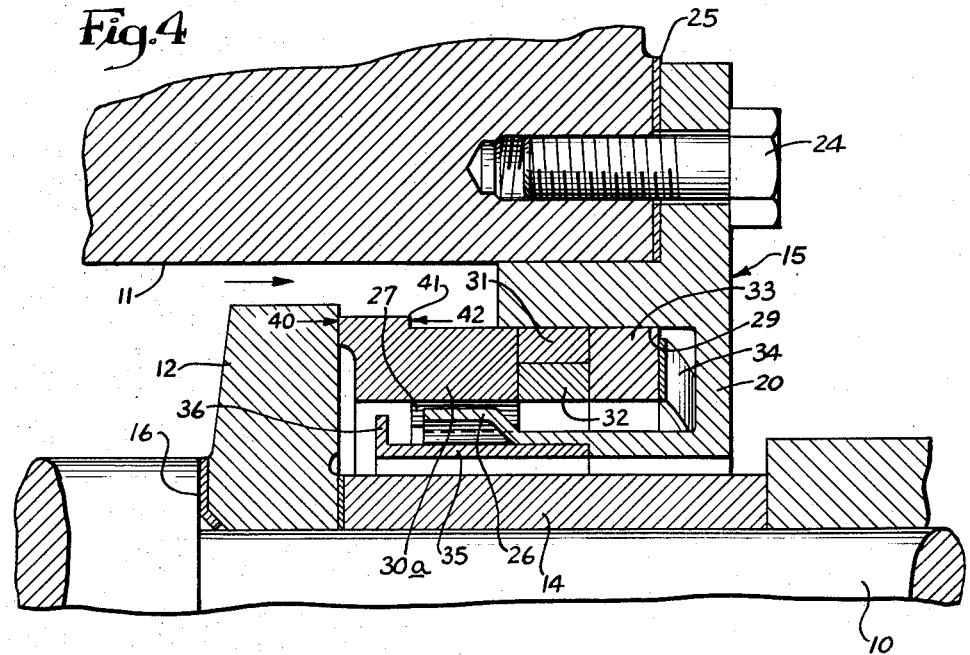
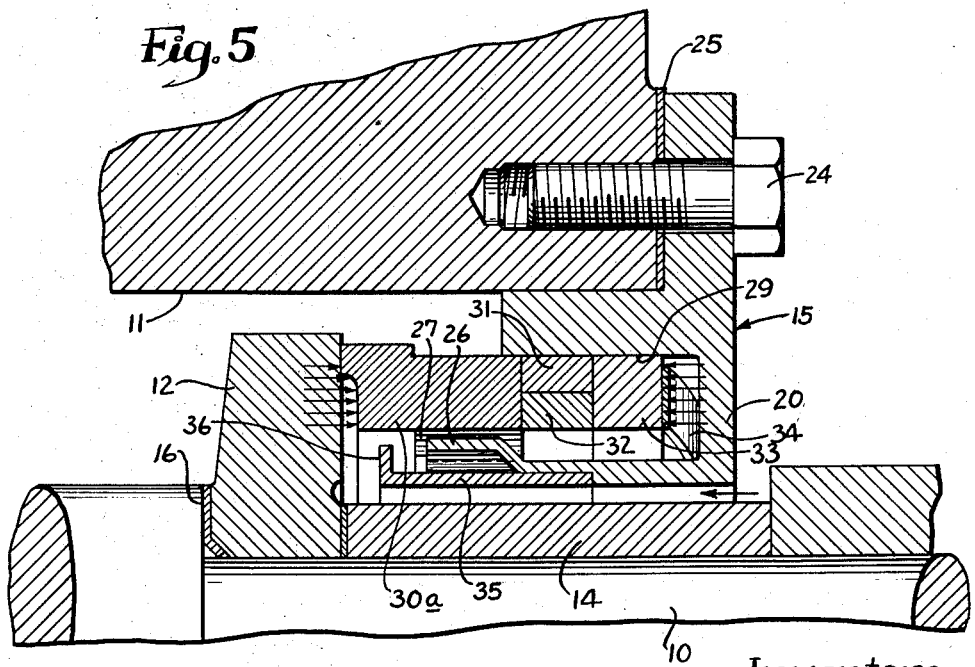

United States Patent Office 2,882,076
Patented Apr. 14, 1959

2,882,076

ROTARY SEAL

William F. Laser, Hinsdale, and Kermit D. Yost, Skokie, Ill., assignors to City National Bank and Trust Company of Chicago, as trustee Application August 23, 1956, Serial No. 605,878

3 Claims. (Cl. 286—11.14)

The present invention relates to rotary seals and more particularly to a cartridge type seal capable of use under extreme operating conditions.

If a seal is to be subject to high temperatures, corrosive fluids whether liquid or gas, and great pressures, it is desirable to avoid the use of O rings or similar elements made of organic material in either natural or synthetic form. Due to their strength limitations and tendency to break down under such extreme conditions these materials constitute a weak link in the seal assembly. On the other hand, no non-organic seals have been capable of providing a positive high pressure seal both at a high speed of shaft rotation and when the shaft is not rotating at all.

It is an object of the invention to provide a rotary seal capable of sealing under extremely high temperature and pressure conditions regardless of whether the sealed elements are at rest or are rapidly rotating. It is another object to provide a seal of the above type which is capable of resisting the action of corrosive fluids which would result in early failure of conventional type seals. It is a more specific object to provide a positive seal that does not utilize O rings or other natural or synthetic organic sealing members which may be subject to deterioration by heat or the action of the sealed medium.

It is a related object to provide a seal having a substantially longer life than conventional seals under difficult operating conditions and which largely eliminates the need for care and maintenance.

It is an additional object to provide a positive non-organic seal having a minimum number of elements mounted within a case or cartridge to form a convenient and compact seal "package."

It is a further object of the invention in one of its aspects to provide a positive non-organic seal wherein a condition of perfect hydraulic balance may be obtained effective under either pressure or vacuum sealing conditions.

Other objects and advantages of the invention will become apparent upon reading the following detailed discussion and upon reference to the attached drawings in which:

Figure 1 is a section view of a seal constructed according to the invention installed in a shaft assembly.

Fig. 2 is a view taken along line 2—2 of Fig. 1.

Fig. 3 is a view taken along line 3—3 of Fig. 1.

Fig. 4 is a partial view similar to Fig. 1, showing the balance of hydraulic forces with the pressure on the left of the seal.

Fig. 5 is a partial view similar to Fig. 4, showing the balance of hydraulic forces with the pressure on the right of the seal.

While the invention will be described in connection with a preferred embodiment, it will be understood that we do not intend to limit the invention to that embodiment but, on the contrary, intend to cover such alternative embodiments and constructions as may be included within the spirit and scope of the appended claims.

Turning now to Fig. 1, there is shown a shaft 10 mounted for rotation and extending through the wall of a pressurized housing 11. A rotary seal 15 constructed according to the invention is provided to confine the fluid, under pressure, to the left of the seal within the housing. The fluid may be gas or liquid.

Fixed to the shaft 10 is a rotor 12 having a smooth, flat sealing face 13 extending radially. To aid in positioning and supporting the rotor, a sleeve 14 is provided to tightly surround the shaft and hold the rotor against a shoulder 16 on the shaft. The shaft, rotor and sleeve rotate as one unit.

To support the stator of the seal an annular cartridge or cup 20 is provided. This cup has two cylindrical portions 21 and 22 which define an annular chamber 23, and is adapted to fit snugly into the opening of the housing through which the shaft extends. The cup is secured to the housing by any convenient means, such as by bolts 24, and a gasket 25 or the like is utilized to assure that the assembly is fluid tight.

Carried within the annular chamber is an annular stator 30 which has both a front and rear flat sealing face. The front sealing face of the stator is kept in sealing engagement with the sealing face 13 of the rotor by urging the stator 30 toward the rotor, as will be more fully discussed below. The precisely machined and finished sealing faces abut to form a type of positive seal well known in the art. The stator is restrained from rotating with the rotor by the offset portions 26 of the cup which register with slots 27 formed in the stator as is shown in Fig. 3. The stator is thus keyed to the inner cylindrical portion of the case and free to slide axially.

In accordance with the present invention a plurality of split rings sealed together with their splits out of register and in sealing, slidable engagement with respect to the inner wall of the cartridge are provided to seal the stator to its case. Thus, in the present embodiment three split rings 31—33 are nested together as a group adjacent the back surface of the stator and within the machined inner surface 29 of the cup. All four surfaces of the first split ring 31 are precision machined and finished to form sealing surfaces, and this split ring is slightly compressed and closely fitted within the annular chamber 23 adjacent to the stator 30. The split ring 32 is dimensioned to lie inside the ring 31 and has two accurately machined flat surfaces defining an axial thickness which is exactly the same as the ring 31. The outer cylindrical surface of the second ring 32 is highly machined and dimensioned so that when the ring 32 is telescoped within the first ring 31 with the splits out of register a continuous peripheral seal is achieved.

In carrying out the invention the third split ring 33 is positioned to axially abut the first two rings and with its split out of register with the splits thereof, as shown in Fig. 2. The third split ring 33 is twice as thick as either of the first two and only its outer cylindrical surface and inner flat side are formed as sealing surfaces. The third ring 33 is slightly compressed and closely fitted within the annular chamber with its flat sealing surface adjacent the first two rings. Finally, a spring 34 is disposed within the annular chamber to urge the third split ring 33 away from the case portion which constitutes an end wall for the chamber. In the preferred embodiment this spring takes the form of an annular wavy disc.

It thus can be seen that the spring urges the third split ring 33 to the left in Fig. 1, which in turn urges the split rings 31 and 32 to the left, and they in turn urge the stator 30 into sealing engagement with the rotor 12. A positive seal is produced between the stator and the case by the first split ring. It expands, due to its inherent resiliency, into sealing engagement with the cylindrical surface 29 of the case and it is urged by the spring 34 into sealing engagement with the rear sealing face of the stator. This results in a positive seal about the periphery of the split ring, except for that portion where the gap caused by splitting is located. This gap is closed by the second and third split rings 32 and 33. Ring 32 expands into sealing engagement with ring 31 to close the inner open side of the gap, and ring 33 is urged into sealing engagement with the side of ring 31 to close the remaining open side of the gap. The three split rings, therefore, combine to produce a positive seal between the stator and the case preventing leakage both axially and radially, but which, nevertheless, permits the stator to slide axially.

In order to retain the stator within the annular chamber prior to installation, a cap 35 is provided which is of cylindrical form fitting into an annular recess formed on the inside of the cup. One edge is flared outwardly to form a lip 36 which overhangs, when the cap is in place, the open end of the annular chamber 23 in the path of movement of the stator. Thus the lip 36 forms a stop which limits the outward sliding of the stator and permits the seal to be handled and sold as a single-unit cartridge.

The choice of materials for the elements of the seal depends largely upon the nature of the gas or liquid to be sealed. The stator 12, for example, can be composed of carbon, ceramic material or metal. The split rings 31, 32, 33 and the case 20 can be stainless steel or other corrosion resistant metal. The spring 34 is preferably of beryllium copper which can withstand high temperatures while retaining its resilient characteristics.

One of the features of the invention is that the seal can be formed to be in practically perfect hydraulic balance whether a pressure or vacuum is being sealed. Hydraulic balance is the property which causes the sealing force to be substantially independent of the pressure exerted by the sealed medium. If a seal were not in hydraulic balance the fluid pressure on one side of the seal would either tend to move the stator away from the rotor and allow the fluid to escape or would urge the stator more tightly against the rotor causing unnecessary friction and wear. Figs. 4 and 5 show how the stator of the invention is preferably shaped to put the seal in hydraulic balance for either a pressure or vacuum seal. In Fig. 4 it is assumed that the fluid under pressure is at the left of the seal. In a rotary seal of this general type the liquid or gas under pressure seeps between the cooperating sealing surfaces of the stator and the rotor to a very limited extent. This seepage produces a force indicated by the arrow 40 which tends to separate the stator from the rotor. To balance this force a small ridge 41 is formed on the outer surface of the stator and the surrounding fluid pressure exerts a counterforce against the ridge in the direction indicated by the arrow 42. As the seepage referred to above extends inwardly only about 1/32 of an inch, the ridge 41 is likewise quite small.

Where the housing 11 encloses a vacuum, the fluid pressures are exerted from the opposite side of the seal, as shown in Fig. 5. In this case there would be pressure on the third split ring 33, shown by the arrows at the left in Fig. 5, tending to force the stator to the left. This pressure is balanced by the force exerted on the undercut portion on the front face of the stator 30 together with the small additional force resulting from fluid seepage between the sealing faces.

It is, therefore, seen that the stator is urged against the rotor solely by the force of the spring 34 and that the amount and direction of the pressure exerted by the sealed medium cannot add to or substract from that force.

We claim as our invention:

1. In a rotatable shaft assembly a rotary seal comprising a rotor fixed to the shaft and having a radial sealing surface, an annular cartridge case surrounding the shaft and providing a cylindrical interior sealing surface disposed axially along the shaft, an annular stator slidably carried within said cylindrical sealing surface and having front and rear radial sealing surfaces, a split ring positioned at the rear of said stator resiliently expanded into sealing engagement with said cylindrical sealing surface, means to urge said split ring into sealing engagement with the rear surface of the stator and the stator into sealing engagement with the rotor, and means for sealing the gap caused by the split in the ring against gas leakage in both radial and axial directions.

2. In a rotatable shaft assembly a rotary seal comprising a rotor fixed to the shaft and having a radial sealing surface, an annular cartridge case surrounding the shaft and providing a cylindrical interior sealing surface disposed axially along the shaft, an annular stator slidably carried within said cylindrical sealing surface and having front and rear sealing surfaces, a first split ring positioned at the rear of said stator and in sealing engagement with said cylindrical sealing surface, a second split ring positioned within said first ring and in sealing engagement therewith, said first and second rings being of equal width, a third split ring positioned adjacent the first two rings in sealing engagement with said cylindrical sealing surface, said three rings having all of their split portions out of register, and means to urge the third split ring into sealing engagement with the first and second rings, the first and second rings into sealing engagement with the rear surface of the stator and the stator into sealing engagement with the rotor.

3. A cartridge seal for use with a rotable shaft assembly having a rotor provided with a radial sealing surface comprising an annular cartridge case adapted to surround the shaft, said case providing a cylindrical interior sealing surface adapted to extend axially along the shaft, an annular stator slidably carried within said cylindrical sealing surface and having front and rear radial sealing surfaces, said front sealing surfaces adapted to abut the radial sealing surface of the rotor, a split ring positioned at the rear of said stator and expanded into sealing engagement with said cylindrical sealing surface, and means to resiliently press said split ring into sealing engagement with the rear surface of the stator and thus resiliently bias said stator for sliding movement and means for sealing the gap caused by the split in the ring against gas leakage in both radial and axial directions.

References Cited in the file of this patent

UNITED STATES PATENTS

| | | |
|---|---|---|
| 465,573 | Glenn | Dec. 22, 1891 |
| 1,097,074 | Bennett | May 19, 1914 |
| 1,879,855 | Morton | Sept. 27, 1932 |
| 2,220,771 | McHugh | Nov. 5, 1940 |
| 2,348,939 | Thompson | May 16, 1944 |
| 2,391,159 | Hermansen | Dec. 18, 1945 |
| 2,395,359 | Vedovell | Feb. 19, 1946 |
| 2,592,728 | Payne | Apr. 15, 1952 |